US005826201A

United States Patent [19]
Gratias

[11] Patent Number: 5,826,201

[45] Date of Patent: Oct. 20, 1998

[54] ANTENNA MICROWAVE SHIELD FOR CELLULAR TELEPHONE

[75] Inventor: Greg Gratias, Auburn, Wash.

[73] Assignee: Asterion, Inc., Kent, Wash.

[21] Appl. No.: 745,985

[22] Filed: Nov. 8, 1996

Related U.S. Application Data

[63] Continuation of Ser. No. 982,091, Nov. 25, 1992, abandoned.

[51] Int. Cl.[6] ....... H04B 1/38

[52] U.S. Cl. ....... 455/575; 455/90; 455/129; 343/702; 343/841

[58] Field of Search ....... 455/89, 90, 117, 455/128, 129, 347, 575; 343/702, 841, 836, 837, 912, 915, 833; 379/59, 437, 440, 447, 451; 361/816, 818

[56] References Cited

U.S. PATENT DOCUMENTS

| | | | |
|---|---|---|---|
| D. 299,719 | 2/1989 | Martensson | D14/38 |
| D. 303,382 | 9/1989 | Yoshihara | D14/38 |
| D. 320,984 | 10/1991 | Tattari | D14/38 |
| 2,490,782 | 12/1949 | Collup . | |
| 2,599,944 | 6/1952 | Salisbury . | |
| 3,196,442 | 7/1965 | Leffelman . | |
| 3,476,882 | 11/1969 | Vogelman | 379/61 |
| 3,962,553 | 6/1976 | Linder et al. | 379/61 |
| 4,189,730 | 2/1980 | Murdock | 343/841 |
| 4,460,899 | 7/1984 | Schmidt et al. | 343/841 |
| 4,471,493 | 9/1984 | Schober . | |
| 4,481,382 | 11/1984 | Villa-Real | 379/61 |
| 4,640,987 | 2/1987 | Tsukada et al. | 379/61 |
| 4,668,958 | 5/1987 | Keiser | 343/841 |
| 4,689,632 | 8/1987 | Graham | 343/837 |
| 4,694,485 | 9/1987 | Iwase | 379/61 |
| 4,845,772 | 7/1989 | Metroka et al. . | |
| 4,941,207 | 7/1990 | Maeda et al. | 343/841 |
| 4,979,205 | 12/1990 | Haraguchi | 379/61 |
| 5,008,778 | 4/1991 | Peyerl | 361/415 |
| 5,012,114 | 4/1991 | Sisson, Jr. | 250/519.1 |
| 5,014,346 | 5/1991 | Phillips et al. . | |
| 5,061,945 | 10/1991 | Hull et al. | 343/840 |
| 5,062,132 | 10/1991 | Yasuda et al. . | |
| 5,170,173 | 12/1992 | Krenz et al. | 343/702 |
| 5,335,366 | 8/1994 | Daniels . | |
| 5,383,098 | 1/1995 | Ma et al. | 361/818 |

FOREIGN PATENT DOCUMENTS

| | | |
|---|---|---|
| 59-92629 | 5/1984 | Japan . |
| 61-56524 | 3/1986 | Japan . |
| 2-54630 | 2/1990 | Japan . |
| 4-127723 | 4/1992 | Japan . |

OTHER PUBLICATIONS

Jaski, "Detecting Microwave–Radiation Hazards," *Electronics World,* 65:6 (1961).

Keller, "McCaw to Study Cellular Phones as Safety Questions Affect Sales," *Wall Street Journal,* Jan. 29, 1993.

Cell Shield Engineering Test Report No. 16272—Feb. 24, 1993.

Motorola Ultra Classic Cell Phone —Ser. No. 991GSS33024.

*Primary Examiner*—Edward F. Urban
*Attorney, Agent, or Firm*—Sheridan Ross P.C.

[57] ABSTRACT

A method and apparatus for shielding and/or redirecting radiation from a portable communication device, such as a cellular telephone is provided. In one embodiment, a conductive shield or passive antenna is positioned between the cellular telephone active antenna and the location of the user's head when the cellular telephone is in the operative position. In one embodiment, the shield is configured to reflect radiation in a pattern which is multi-directional. In another configuration, the shield is configured to reflect radiation in a preferred axial direction. Latches or other devices can be used to assure that the shield is positioned and maintained in the desired location. Insulation may be used between the shield and antenna. The shield can be made of a single unitary piece or a plurality of disconnected pieces. The shield may be reconfigurable, e.g., to accommodate a telescoping antenna.

27 Claims, 4 Drawing Sheets

FIG. 11
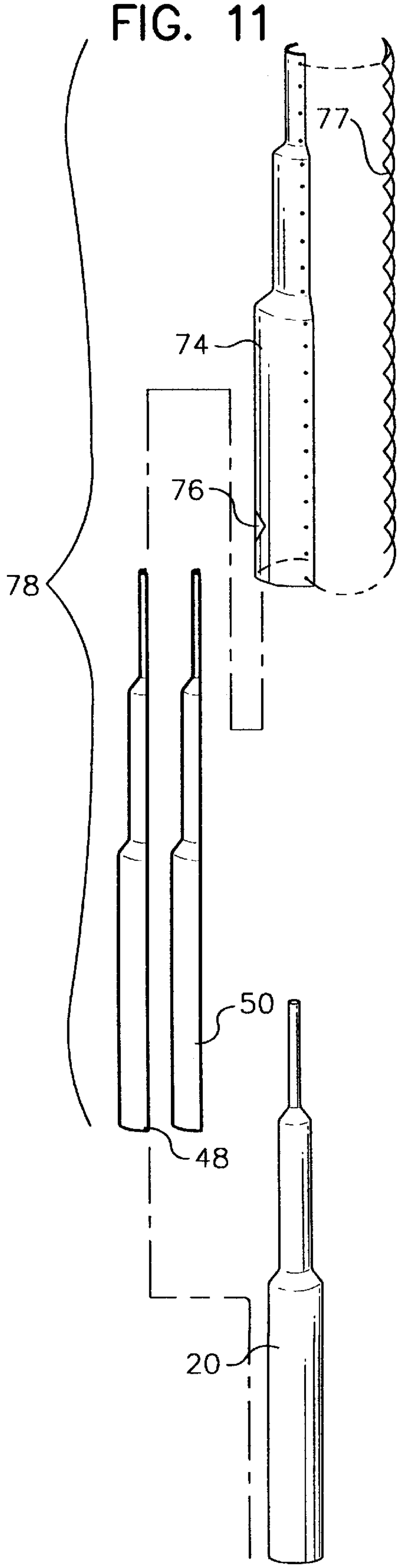
FIG. 12
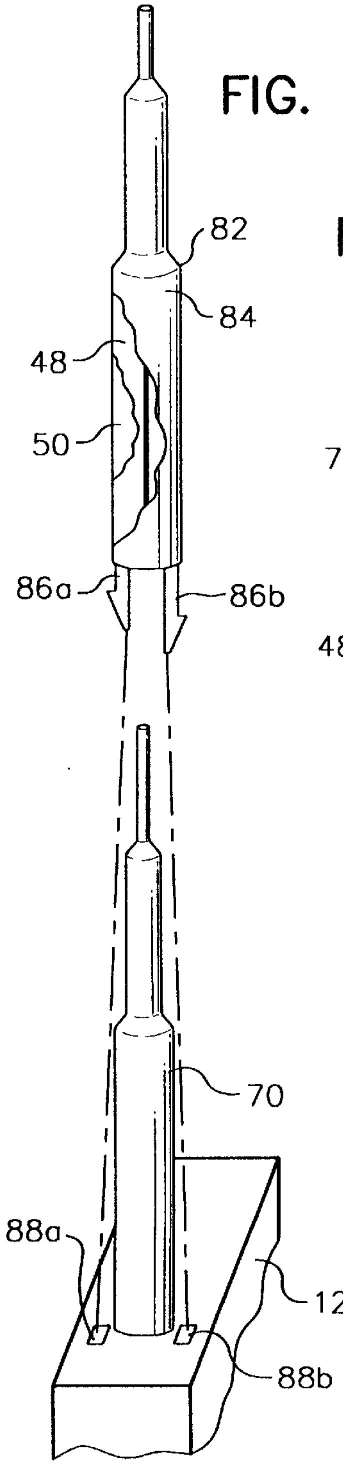
FIG. 13
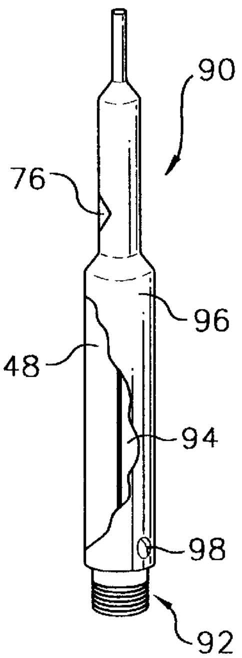
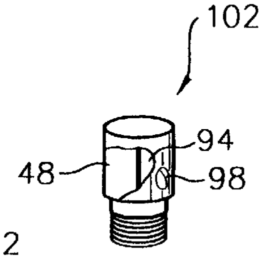
FIG. 14

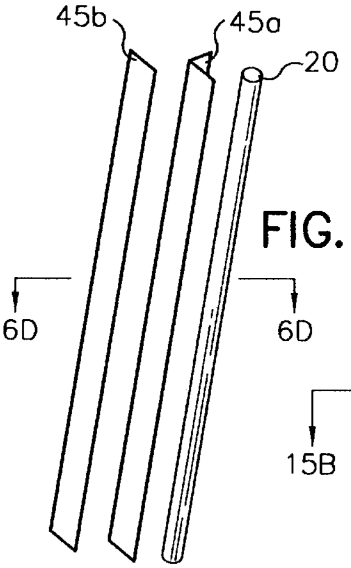
FIG. 6C
FIG. 15A
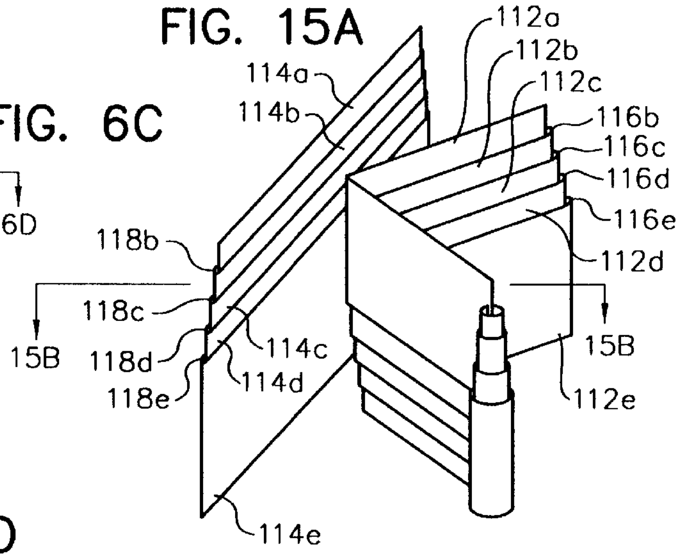
FIG. 6D
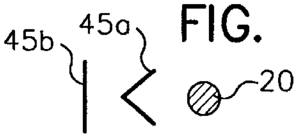
FIG. 15B
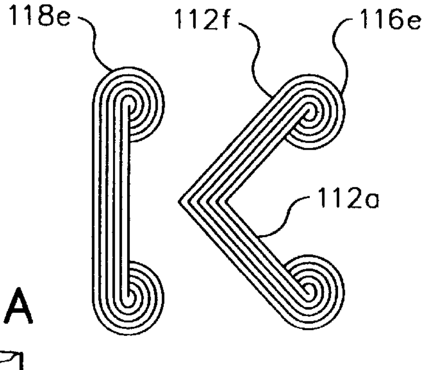
FIG. 16
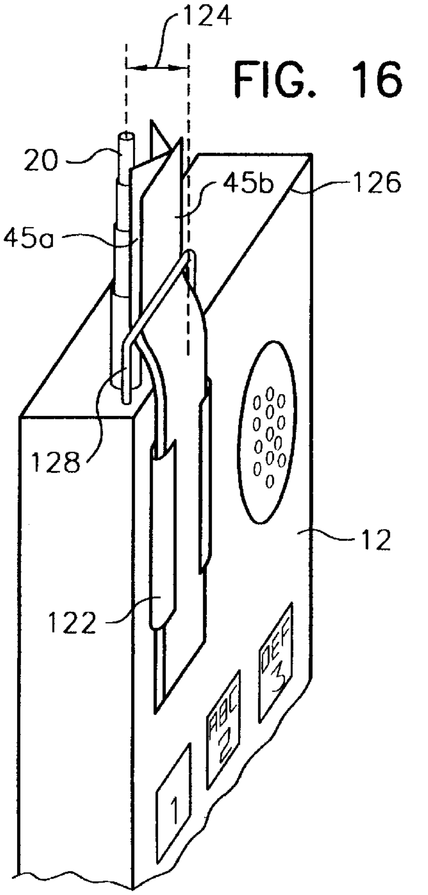
FIG. 17A
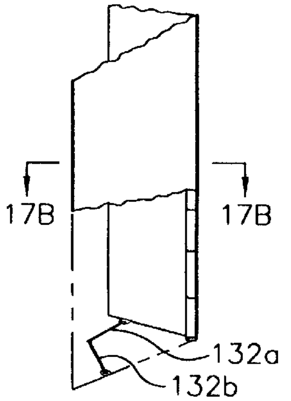
FIG. 17B
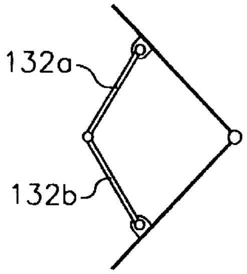

ANTENNA MICROWAVE SHIELD FOR CELLULAR TELEPHONE

This is a Continuation of application Ser. No. 07/982,091, filed Nov. 25, 1992, now abandoned, incorporated herein by reference.

The present invention relates to apparatus and methods for shielding the human body, or portions thereof, from radiation emitted by portable communication equipment and in particular to shielding the antenna of a cellular telephone.

BACKGROUND OF THE INVENTION

Portable communication devices typically provide communication by emitting electro-magnetic radiation. Examples include cellular telephones, cordless telephones, walkie-talkies, and the like. Furthermore, portable communication devices are expanding in popularity and are finding additional applications such as "wireless" networking of personal computers. In all cases, in order to provide reliable and sustainable communication links, it is desired that the radiation have the proper field strength and contour. Particularly in the case of cellular telephones, signals take the form of microwave radiation between about 500 Mhz and about 2,000 Mhz. Typically, cellular telephones emit radiation omni-directionally (i.e., with radially symmetric contours) having a field strength at the point of emission, of about ½ watt.

Many personal communication devices derive their power from batteries. In order to provide the longest effective battery charge, it is desired to avoid wasting emitted radiation which will be absorbed by non-target bodies. Furthermore, in order to provide a desired field strength, it is preferred to avoid wasting radiation in a direction that will result in substantial absorption of the radiation by non-target bodies. Additionally, many members of the public have concerns about unnecessary exposure to electromagnetic radiation, particularly microwave radiation.

Accordingly, it would be useful to provide a personal communication device such as a cellular telephone in which radiation is not wasted by being absorbed in non-target objects, such as the human body.

SUMMARY OF THE INVENTION

The present invention includes the recognition of certain problems in previous devices, such as those noted above. According to the present invention, the radiation-emitting member (e.g., antenna) of a personal communication device (e.g., a cellular telephone) is shielded, preferably to reduce or avoid radiation in a direction toward the body, and particularly the head, of the user. According to one embodiment of the invention, a substantially electrically-conductive antenna shield is placed in a substantially fixed position with respect to the antenna with the position being located so that the shield resides between the antenna and the body, or a portion thereof (such as the head), of the user when the telephone is in its normal operating position. In one embodiment, the shield is incorporated in a device configured to fit over or around the antenna of existing communication products such as cellular telephones. In another embodiment, the shield is attached to or incorporated in the antenna which is provided with or for a cellular telephone. In one embodiment, a substantially non-conductive or insulative material is positioned between the shield and the antenna. Preferably, the shield is substantially effective in shielding a predetermined angle, such as between about 2° and about 45°.

Preferably, the shield is substantially reflective of the radiation emitted by the telephone. In this fashion, the shield can also be viewed as a reflector. Thus, the shield/reflector not only protects a given region from unwanted radiation, but also redirects the radiation that (in the unshielded device) would have been emitted into that region, in other directions to enhance the field strength of the signal in the other directions. In some embodiments, the shield/reflector is shaped so as to achieve a particular desired shape of radiation enhancement. In one embodiment, the shield/reflector has a surface which is substantially convex in the direction towards the antenna.

BRIEF DESCRIPTION OF THE DRAWINGS

FIG. 6C is a perspective view of a shielded antenna according to an embodiment of the present invention;

FIG. 6D is a cross-sectional view taken along line 6D—6D of FIG. 6C.

FIG. 11 is an exploded view of a shielding sheath for an antenna according to an embodiment of the invention;

FIG. 12 is an exploded view of a shielding sheath for an antenna according to an embodiment of the invention;

FIG. 13 is a side view, partially cut-away, showing a shielded original or replacement antenna according to an embodiment of the invention;

FIG. 14 is a side view, partially cut-away, showing a shielded original or replacement antenna according to an embodiment of the invention;

FIG. 15A is a perspective view of a telescoping shield, according to an embodiment of the present invention;

FIG. 15B is a cross-sectional view taken along lines 15B—15B of FIG. 15A;

FIG. 16 is a partial perspective view of a cellular telephone with a guided sliding shield, according to an embodiment of the present invention;

FIG. 17A is a partial perspective, partially cutaway view of an angularly adjustable shield, according to an embodiment of the present invention; and FIG. 17B is a cross-sectional view taken along line 17B—17B of FIG. 17A.

DESCRIPTION OF THE PREFERRED EMBODIMENTS

Figure 1:
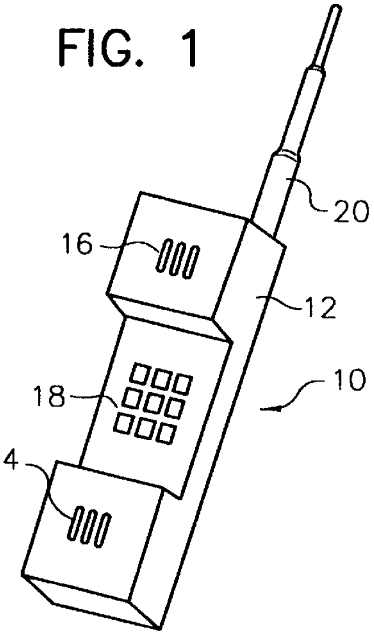
FIG. 1 is a perspective view of a cellular telephone, showing an antenna.
Figure 2:
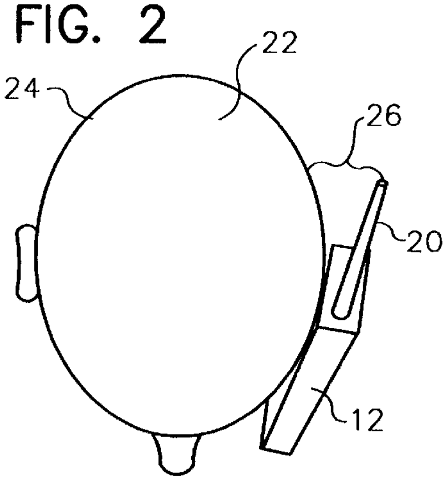
FIG. 2 is a top view of a cellular telephone in the normal operating position with respect to a user.

As depicted in FIG. 1, a cellular telephone 10 includes a handset 12, having a region 14 for a microphone, a region 16 for a speaker and a keypad area 18. The cellular telephone 10 transmits communication signals by radiation from an antenna 20. In a typical cellular telephone, the radiation is microwave radiation having a frequency between about 500 Mhz and about 2,000 Mhz. The normal use position of the handset 12 is depicted in FIG. 2. In this position, the handset 12 is held with the speaker region 16 adjacent an ear of the user 22 and with the microphone region 14 adjacent the mouth. In this position, the antenna 20 is in the general proximity of the head 24 of the user 22. Because of this proximity, the head 24 of the user is within a relatively high field-intensity region of the radiation from the antenna 20 e.g., a field intensity of about ½ watt or more. It is believed that a significant portion of the radiation from the antenna 20 that reaches the user 22 is absorbed by the body, particularly the head, of the user 22. The intensity of the radiation is inversely proportional to the cube of the distance from the antenna. It may be that other types of radiation sources provide exposure to human bodies. However cellular telephones are of particular concern because, in the operating position, the antenna 20 is a relatively short distance 26 from the user's head 24, such as six inches or less, the intensity will be relatively large, such as about 0.200 watts or more. This is particularly true of high frequency radiation such as microwave radiation which has a lower penetration than lower frequency radiation. For this reason, the magnitude of the problem of user absorption of radiation is peculiar to situations in which the user is positioned physically close to a high frequency radiation source, such as the situation during use of cellular telephones, as depicted in FIG. 2. Because many cellular telephone handsets 12 are being configured in a miniature or compact version, the antenna 20 is positioned particularly close to the head 24 and there is little or no opportunity for moving the antenna 20 away from the head 24.

Because a portion of the power emitted from the antenna 20 is absorbed by the head 24, there is a significant amount of wasted power. This power is wasted in the sense that it represents a drain on the telephone power source (such as a parallel with the active antenna 20. In many cellular telephones, the antenna 20 is substantially flexible. Thus, the configuration of FIG. 4 could result in the active antenna 20 striking the passive antenna 34 or in the active antenna 20 being flexed out of substantially parallel alignment with the passive antenna 34. Thus, it may be necessary to physically couple the passive antenna 34 to the active antenna 20 (e.g., by strapping or binding) to maintain the two antennas substantially parallel.

Figure 3:
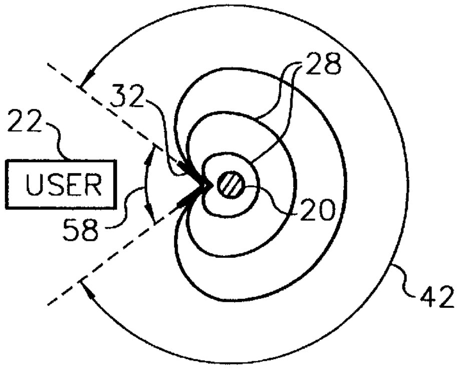
FIG. 3 is a schematic contour diagram of radiation field strength from a shielded antenna.
Figures 4A, 4B, 5A, 5B, 6A, 6B, 7A, 7B, 8A, 8B, 9A, 9B:
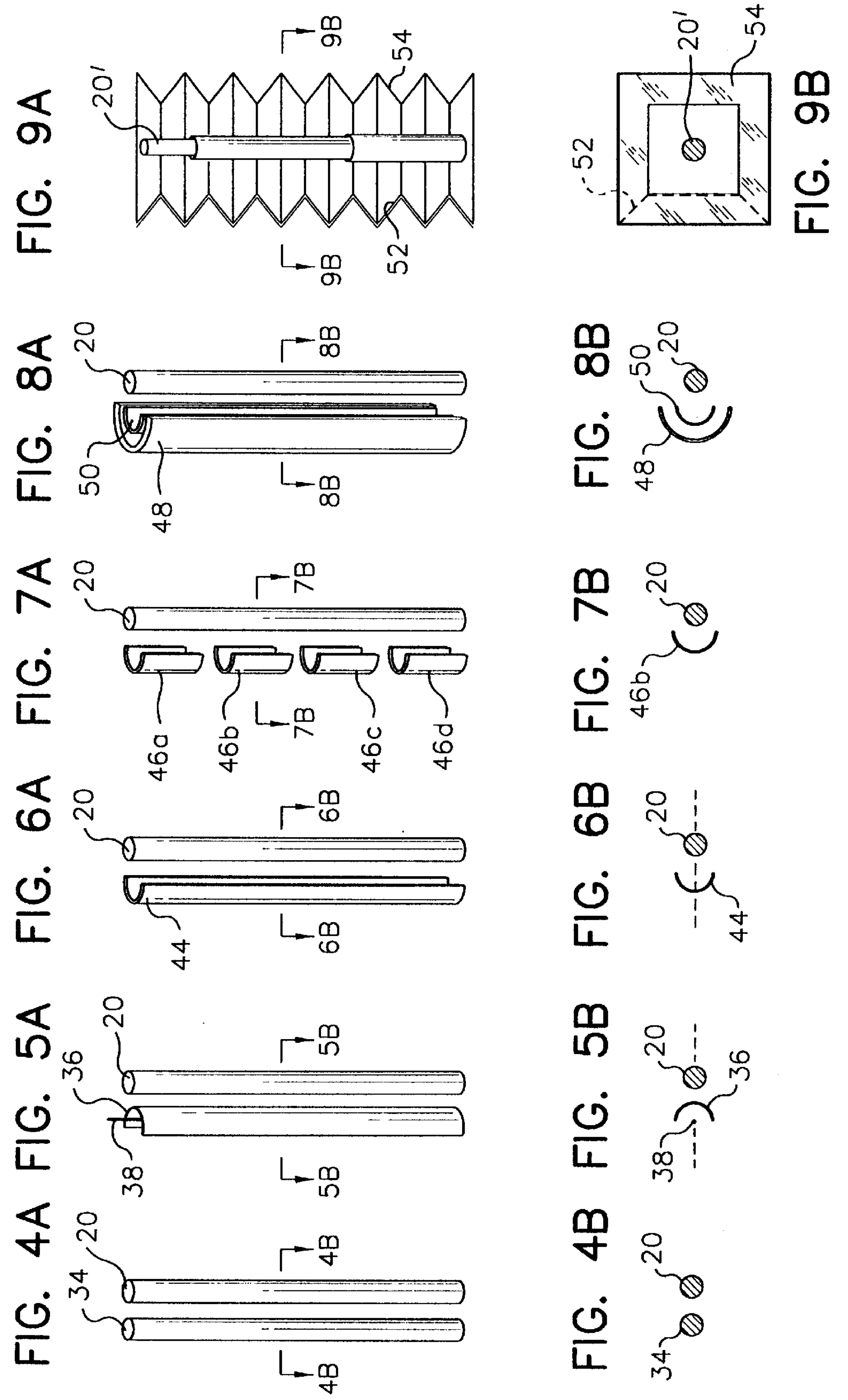
FIG. 4A is a perspective view of an antenna shield according to one embodiment of the present invention.
FIG. 4B is a cross-section taken along line 4B—4B of FIG. 4A.
FIG. 5A is a perspective view of a shielded antenna according to an embodiment of the present invention.
FIG. 5B is a cross-sectional view taken along line 5B—5B of FIG. 5A.
FIG. 6A is a perspective view of a shielded antenna according to an embodiment of the present invention.
FIG. 6B is a cross-sectional view taken along line 6B—6B of FIG. 6A.
FIG. 7A is a perspective view of a shielded antenna according to an embodiment of the present invention.
FIG. 7B is a cross-sectional view taken along line 7B—7B of FIG. 7A.
FIG. 8A is a perspective view of a shielded antenna according to an embodiment of the present invention.
FIG. 8B is a cross-sectional view taken along line 8B—8B of FIG. 8A.
FIG. 9A is a perspective view of a shielded antenna according to an embodiment of the present invention.
FIG. 9B is a cross-sectional view taken along line 9B—9B of FIG. 9A.

In the embodiment depicted in FIGS. 5A and 5B, the shield 36 is configured to provide a substantially convex surface facing the active antenna 30 such as by partially bending around a support such as a wire 38. The convex shape may be either curved, as depicted in FIG. 5B, or angled as depicted in FIG. 3. In one embodiment, the shield 36 substantially reflects radiation which arises from the antenna 20. The convex shape of the shield 36 results in the reflected radiation being distributed in directions other than along the antenna-shield axis 40. Thus, as seen in FIG. 3, the reflected radiation is redistributed approximately equally throughout the angle 42 so that in the region defined by the angle 42 the contours 28 are approximately circular contours. When the shield is reflective, it should preferably be shaped to avoid substantial amounts of destructive interference between the emitted and reflected radiation.

Figure 3A:
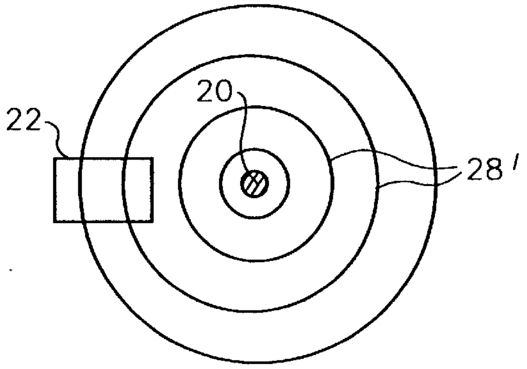
FIG. 3A is a schematic contour diagram of omni-directional radiation field strength from an unshielded antenna.
Figure 3B:
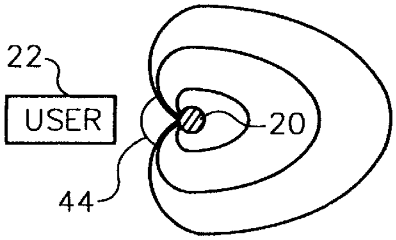
FIG. 3B is a schematic contour diagram of radiation field strength from a shielded antenna.

In contrast, in the embodiment depicted in FIG. 6, the shield 44 has substantially concave surface facing the antenna 20. In this configuration, when the shield 44 reflects radiation from the antenna 20, the reflected radiation is substantially confined to the antenna-shield axis 40 resulting in a field strength which is enhanced in the direction away from the user, as depicted, for example, in FIG. 3B. The shield 44 can be either curved, as depicted in FIG. 6, or angled.

The embodiment depicted in FIGS. 6C and 6D show a shield having a concave portion 45*a* and a planar portion 45*b*. This configuration is believed to achieve a large reduction in battery) which is not put to a useful purpose and because the power which is absorbed by the head 24 could have been used for enhancing the field strength of the radiation to provide more reliable, consistent, longer-distance and/or longer-duration communication.

Furthermore, the effects of absorption of this level of radiation by the human head are not fully understood. Because many members of the public are apprehensive of possible deleterious health effects arising from exposure to such radiation, members of the public may choose to forego the benefits of cellular communication if cellular communication results in exposure to such radiation.

According to the present invention, the radiation from the antenna 18 is reconfigured to reduce or avoid emission of radiation in a direction which (in the absence of reconfiguration) would expose the user when the cellular telephone was in the normal operating position. According to one embodiment, reconfiguration of the radiation is achieved by a shield.

FIG. 3 depicts contours 28 of equal field intensity in a plane passing through an antenna 20. In the configuration of FIG. 3, a shield 32 is positioned between the antenna 20 and the user 22. As seen in FIG. 3, the effect of the shield 32 is to reduce the field intensity of the radiation in the vicinity of the user 22. In one embodiment, the field strength at the center of the protection angle 58, at a distance of six inches is about 0.02 watts. This effect can be understood by comparing FIG. 3 with the contour diagram of FIG. 3A which is a corresponding diagram for an unshielded antenna. In a typical cellular phone, radiation from the antenna 20 is omni-directional so that the contours 28' will be substantially circular. A comparison of FIG. 3A and FIG. 3 indicates how the shield 32 reduces or eliminates the amount of radiation from the antenna 20 which reaches the user 22.

A number of configurations are possible for the shield 32. As seen in FIG. 4A and 4B, a shield can be provided in the form of a second passive antenna 34 substantially field strength in the user-protection region 58 such as a reduction in field strength of as much as 90%, preferably as much as 98% or more. Without wishing to be bound by any theory, it is currently believed that the concave portion 45*a* acts as a collector or accumulator which channels the radiation to the apex of the collector 45*a* whence it propagates to the portion 45*b* that acts as a reflector. The angle or curvature of the concave portion can be selected or adjusted to vary the field-strength pattern. In one embodiment, the collector 45*a* defines an angle of abut 90°.

In the embodiment depicted in FIG. 7, the shield is made up of a plurality of spaced-apart segments 46*a*, 46*b*, 46*c*, 46*d*, 46*e*. Although the segments are depicted as concave, they can have a variety of shape including convex and planar. Providing a shield in the form of separated segments is believed to reduce or eliminate generation of harmonics of the emitted radiation which could otherwise interfere with communication. In one embodiment, the shield is has between 4 and 6 segments. Without wishing to be bound by any theory, it is believed that the main harmonic appears at twice the base frequency, with lesser harmonics appearing at other multiples and sub-multiples of the base frequency.

In the embodiment depicted in FIGS. 8A and 8B, a substantially insulating material 50 is positioned between the antenna 20 and the shield 48. The insulative material 50 is believed to assist in reducing the production of electronic static or noise. Any of a number of materials can be used for the insulator 50 including insulating plastic such as polyvinyl plastic, rubber, paper, ceramic and the like. Insulation can be used with any of the shield configurations (FIGS. 4–9).

FIG. 9 depicts a configuration in which the antenna 20', rather than being a fixed-length antenna, is a telescoping antenna. In the embodiment of FIG. 9, the shield 52 is configured to be reconfigurable to match the length selected for the telescoping antenna 20'. In the embodiment of FIG. 9, this is achieved by providing a pleated or accordion-shaped shield 52. The shield 52 can be coupled with or integrally formed as part as a bellows 54.

In another embodiment, the shield, rather than being accordion-shaped or folding is also a telescoping device. Providing a telescoping device is more difficult for more complex shapes of shields. FIGS. 15A and 15B depict one way of forming a telescoping shield corresponding to the shield depicted in FIGS. 6C and 6D. In the embodiment of FIGS. 15A and 15B, the shield is formed of a plurality of flat or angled plates 112*a*–112*e*, 114*a*–114*e*, with ends 116*b*–116*e*, 118*b*–118*e* of all but the inner-most plates being bent-around the ends of adjacent plates to permit telescoping movement.

The shield 32, 34, 36, 44, 46, 48, 52, can be formed of a number of materials, preferably, substantially electrically conductive materials. Preferably, the shield is substantially light-weight and economical, such as a metal-impregnated plastic. One advantage of metallic impregnated plastic is the ability to undergo repeated flexing without kinking, aging, or cracking. Other materials which can be used include metals such as substantially sheet-like metals, e.g., copper or aluminum foil or mesh. It is also possible to form a radiation-protection device using material which absorb the radiation, rather than reflecting or re-directing it, such as water. It is believed that a water barrier will preferentially absorb wavelengths above about 1 Ghz, thus acting as a low-pass filter. Other materials which efficiently absorb microwave radiation are those developed for radar-evasion, i.e. so-called "stealth" materials.

Preferably, the antenna will be formed of a material that does not create undesirable amount of acoustic noise during flexing, such as the "crackling" sound produced by many plastic materials upon flexing.

Figure 10:
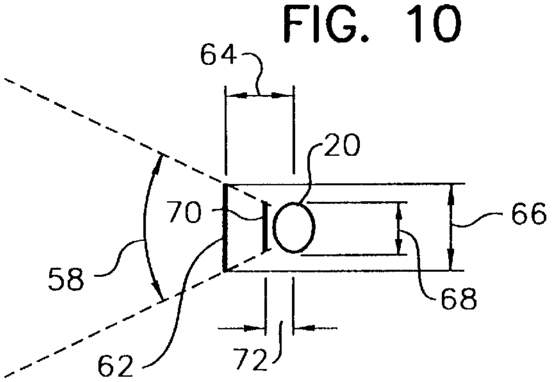
FIG. 10 is a top view of an antenna with two alternative planar shields.

Preferably, the shield 34 extends at least the entire length of the antenna 20. It is believed that when less than the full length of the antenna is shielded, the total amount of radiation protection achieved is a linear function of the portion of antenna length which is shielded. The shape and width (i.e., extent perpendicular to the length of the antenna) of the shield depends on the desired contour of the radiation 28, the desired angle 58 for the region of protection and the distance of the shield from the antenna 20. As depicted in FIG. 10, for a given angle of protection 58, the width of a shield, e.g., a planar shield 62, placed a first distance 64 from the antenna 20 will be greater than the width 68 of a shield 70 which is positioned a smaller distance 72 from the antenna 20.

In the embodiment depicted in FIG. 11, a shield device 48, optionally positioned adjacent to a insulation material 50 is held in place adjacent antenna 20 by a flexible covering such as a fabric 74 held by lacing 76. In another embodiment, a shield could be applied directly to a portion of the antenna, e.g., using adhesives. In this and other embodiments, the shield 48 and/or insulation 50 and/or covering is either shaped to conform to the configuration of the antenna (e.g., the "terraced" configuration, depicted in FIG. 11) or is sufficiently flexible or ductile that it can be substantially conformed to the shape of the antenna 20. Thus, the shield 48 can be incorporated in a larger shielding housing 78 that can contain the shield 48 and insulation material 50 as well as a cover 74 for protection and/or mounting purposes.

Preferably, the external surface of the shielding structure 78 includes an indicium 76 to assist the user in properly mounting the apparatus on the cellular telephone so that the shielding 48 is positioned between the antenna 20 and the user 22. This is particularly important in configurations such as that depicted in FIG. 3B in which improper position of the shield 44 might increase the field strength of radiation which reaches the user 22. Alternatively or additionally to the indicium 76, the shielding structure 78 could be provided with an interlock or failsafe device such that mounting on the antenna 20 is possible only in one orientation. An example would be inter-digitating guides, keys and slots or latches which operate only in the desired orientation.

In the embodiment depicted in FIG. 12, a shielding structure 82 is provided in a substantially unitary configuration which slips longitudinally over the antenna 20 rather than being laced or otherwise attached laterally. In one embodiment, the shielding structure 82 includes an outer housing 84, preferably, formed from a plastic material and configured to fit over the antenna 20. As shown in cut-away, the shielding 48 and insulation 50 can be attached to the interior surface of the hollow housing 84, such as by adhesives, ultrasonic welding and the like. Although the shield could slip over the antenna without being attached thereto, it is preferable to provide some degree of attachment, both to assure that the shield remains in the desired position and also because it is common for users of cellular telephones to use the antenna as a "handle" to pick up or hold the telephone. In one embodiment, the housing 82 can be attached to the telephone handset 12 using latches or deflectable clips 86*a*, 86*b* configured to be received in complementarily-shaped receptacles 88*a*, 88*b*. This latching configuration, will require that the telephone handset 12 be specifically configured with receptacles 88*a*, 88*b* to accommodate the shielding structure 82. Therefore, in order to provide for shielding of telephone handsets that are not provided with devices to accommodate shielding and, in particular to provide shielding for current cellular telephone models, the housing 82 can be provided with attachment devices that do not require apparatus in the handset 12 such as by using clamps, set screws, or adhesives that attach to the antenna 20.

In the embodiment depicted in FIG. 13, shielding 48 is incorporated in a replacement or original antenna 90. A typical cellular telephone antenna 20 is attached to a handset 12 by means of a threaded screw device. Accordingly, the replacement or original antenna 90 includes a substantially similar screw device 92 so that the user can install an original shielded antenna or remove the currently provided antenna 20 and replace it with the replacement antenna 90. The replacement antenna 90 is similar to the original antenna 20, including the antenna body 94 and a protective housing or coating 96 except that shielding 48 is provided as part of the antenna 90. In the configuration of FIG. 13, it is still necessary to ensure that the shielding 48 is provided in the proper position once the replacement antenna 90 is installed. One method of doing this would be to provide for screw threads 92 configured such that when the antenna 90 is correctly attached and tightened, the shield 48 will be in the proper position. Another embodiment would provide the shielding 48 and/or coating or housing 96 to be rotatable with respect to the antenna body 94 with means, such as a set screw 98 for fixing the shield 48 in a given position and, preferably, indicia 76 to indicate, to the user, the location of the shield 48.

Alternatively, the handset 12 could be manufactured with fixed, non-replaceable antennas having shielding already properly-positioned.

FIG. 14 depicts a replacement antenna 102 having a shortened length similar to the length of antennas found in many styles of cellular telephones 12. The antenna in FIG. 14 is provided with an antenna body 94, a shield 48 and a fixing device, such as a set screw 98.

When it is desired to provide an adjustable-length shield (e.g. for use with a telescoping antenna), the shield could be mounted to permit selective insertion into or withdrawal from a pocket formed in the housing of the telephone 12. This configuration is impractical, however, if the device is to be retro-fitted to an existing telephone which may not have internal regions available for accommodating such a pocket. In these cases, a guide device can be mounted on the exterior of the housing 12 to permit the desired length of shield to be withdrawn. The configuration of such a guide and the associated shield is more difficult when the shield has a complex shape. FIG. 16 depicts an embodiment in which shield 45*a*, 45*b*, generally in accord with FIGS. 6C and 6D, is accommodated in a guide 122 mounted on the exterior of a telephone housing 12. Because the antenna 20 is positioned a distance 124 from the edge 126 of the housing, a guide bar 128 is used to position the shield 45*a*, 45*b* adjacent the antenna 20. Preferably the accumulator 45*a* is sufficiently flexible that it can be forced in to a substantially flat configuration adjacent the accumulator 45*b* upon passing over the edge 126, but retains sufficient resiliency to resume the desired concave configuration when it is withdrawn form the guide 122.

In view of concerns about health-effects of radiation, it is useful to provide not only a radiation shield, but also a device for assuring the user that the shield is providing the desired protection. According to one embodiment of the invention, the user of a telephone can be provided with a kit which includes a shield, such as one of those discussed above, combined with a radiation detector. A number of radiation detectors can be used. One type of detector is the type commonly used for detection of radiation from a microwave oven, such a model the Microwita, "Microwave Leakage Detector", available from Tandy Corporation, Ft. Worth, Tex. Although the wavelength of microwave oven leakage detection, about 2 Ghz is higher than that typically used for cellular telephone communication, such a detector can detect the field strength of harmonics form the telephone radiation. This detection can provide sufficient information to permit the user to verify that the shield is reducing radiation from the telephone in a desired direction.

According to one aspect of the present invention, the shield can be adjusted to modify the shape or magnitude of the field strength. For example, the distance of the shield from the antenna can be adjusted such as by adjusting the thickness of intervening insulation material 50 or providing a screw-adjustment or other mechanical adjustment of shield-antenna distance. The shape of the shield can also be adjusted, such as by changing the angle or curvature of an angled or curved shield portion. FIGS. 17A and 17B depict one possible mechanism for simultaneously adjusting both leaves of a hinged shield using pivoted linkages 132*a*, 132*b*.

In light of the above description, a number of advantages of the present invention can be seen. The present invention provides for enhanced battery life and/or reliability, sustainability, duration and range of communication by reducing or eliminating wasted power output. The present invention enhances user confidence by eliminating or reducing user exposure to radiation which many users believe harmful. The present invention provides for proper positioning of antenna shielding, reduces or eliminates harmonics, static and/or undesirable interference.

A number of variations and modifications of the invention can also be used. Although passive shielding has been described, radiation contours can also be reconfigured by properly designing interference between two active radiation emitters such as two active antennas. The present invention can be used in connection with radiation-producing devices other than cellular telephones, such as cordless phones, walkie-talkies, and "wireless" networked or modemed personal computers. The present invention can be used in connection with devices which produce radiation other than microwave radiation, such as personal appliances like electric razors or hair dryers, power tools such as drills or saws and household appliances such as vacuum cleaners. Other conductive materials can be used for shielding including composites, alloys, gold, silver, conductive carbon compounds and the like. The shield can be configured to accommodate movable antennas such as foldable or pivoting antennas. It is currently believed that effectiveness and reliability of the shield could be affected by atmospheric humidity. If shielding is found to be substantially effected by atmospheric humidity, it is believed that the undesirable effects of humidity changes can be ameliorated by providing a space or gap between the shielding or antenna.

Although the present invention has been described by way of a preferred embodiment and certain variations and modifications, other variations and modifications can also be used, the invention being defined by the following claims.

What is claimed is:

1. In a cellular telephone having a first antenna, at least a first portion of said antenna for emitting radiation, the first portion positioned adjacent a user's head when in normal use position, said antenna having an upper end, apparatus for protecting a user from electromagnetic radiation comprising:

a microwave radiation-reflecting or -absorbing shield extending at least to said upper end, wherein said shield comprises a plurality of segments which can be folded substantially adjacent to one another;

further comprising a bellows and wherein said segments are positioned on surfaces of said bellows;

a coupler positioning said shield on said telephone in a fixed position with respect to said telephone substantially between at least said first portion of said antenna and said user's head to provide a field strength pattern of said electromagnetic radiation which, in a plane passing through said first portion of said antenna, said shield and said user's head, is substantially diminished in a first direction within said plane from said antenna toward said user's head without being substantially diminished within said plane from said antenna away from said user's head.

2. Apparatus, as claimed in claim 1, wherein said shield comprises a substantially conductive sheet adjacent said first antenna.

3. Apparatus, as claimed in claim 2, wherein said sheet is spaced from said first antenna by an electrically insulating material.

4. Apparatus, as claimed in claim 2, wherein said sheet comprises a metal.

5. Apparatus, as claimed in claim 2, wherein said sheet comprises a mesh of conductive material.

6. Apparatus, as claimed in claim 2, wherein said sheet comprises a substantially conductive plastic.

7. Apparatus, as claimed in claim 1, wherein said shield is effective to reconfigure said electromagnetic radiation to decrease field strength of said electromagnetic radiation through a first angle subtending an imaginary plane passing through said user.

8. Apparatus, as claimed in claim 7, wherein said first angle is at least about 45°.

9. Apparatus, as claimed in claim 7, wherein the field strength of said electromagnetic radiation is substantially undiminished in the region outside said first angle.

10. Apparatus, as claimed in claim 7, wherein the field strength of said electromagnetic radiation is enhanced in the region outside said first angle.

11. Apparatus, as claimed in claim 7, wherein the field strength of said electromagnetic radiation is substantially equally enhanced in all directions outside said first angle.

12. Apparatus, as claimed in claim 7, wherein the field strength of said electromagnetic radiation is preferentially enhanced in a first direction outside said first angle.

13. Apparatus, as claimed in claim 1, wherein said shield is provided on a sheath configured to fit over said first antenna.

14. Apparatus, as claimed in claim 13, wherein said coupler comprises a latch for connecting said sheath to said cellular telephone.

15. Apparatus, as claimed in claim 1, further comprising an indicium indicating the location of said shield.

16. Apparatus, as claimed in claim 1, wherein said coupler comprises a guide for guiding movement of said shield with respect to said cellular telephone.

17. Apparatus, as claimed in claim 1, wherein said shield has first and second portions movable with respect to one another.

18. Apparatus, as claimed in claim 1, wherein said first portion of said antenna is positioned about 6 inches or less from said user's head.

19. Apparatus as claimed in claim 1, wherein said shield extends for substantially the entire length of said antenna.

20. In a cellular telephone having an antenna, at least a first portion of said antenna for emitting radiation, the first portion positioned adjacent a user's head when in normal use position, said antenna having an upper end, apparatus for protecting a user from electromagnetic radiation comprising:

first means for absorbing or reflecting microwave radiation extending to said upper end wherein said first means comprises a plurality of segments which can be folded substantially adjacent to one another;

further comprising a bellows and wherein said segments are positioned on surfaces of said bellows;

second means for positioning said first means on said telephone in a fixed position with respect to said telephone substantially between said first portion of said antenna and said user's head to provide a field strength pattern of said electromagnetic radiation which, in a plane passing through said first portion of said antenna, said shield and said user's head, is substantially diminished in a first direction within said plane from said antenna toward said user's head without being substantially diminished within said plane from said antenna away from said user's head.

21. Apparatus, as claimed in claim 20, wherein said means for absorbing or reflecting microwave radiation is also a means for enhancing field strength of said radiation in at least a first direction.

22. Apparatus, as claimed in claim 20, further comprising means for reducing harmonic interference.

23. Apparatus, as claimed in claim 20, further comprising means for changing the shape of said radiation field strength.

24. Apparatus, as claimed in claim 23, wherein said means for changing the shape of said radiation field strength comprises means for changing the shape of said first means.

25. Apparatus, as claimed in claim 20, further comprising means for adjusting the length of said first means.

26. A method for changing the field strength contour of electromagnetic radiation emitted from a cellular telephone having an antenna, at least a first portion of said antenna for emitting radiation, the first portion positioned adjacent a user's head when in normal use position, said antenna having an upper end, the method comprising:

providing a microwave radiation-reflecting or -absorbing shield wherein said shield comprises a plurality of segments which can be folded substantially adjacent to one another;

providing a bellows wherein said segments are positioned on surfaces of said bellows;

attaching said shield in a fixed position with respect to said cellular telephone such that it is positioned between at least said first portion of said antenna and the head of a user of said telephone when said telephone is in a normal use position, to provide a field strength pattern of said electromagnetic radiation which, in a plane passing through said first portion of said antenna, said shield and said user's head, is substantially diminished in a first direction within said plane from said antenna toward said user's head without being substantially diminished within said plane from said antenna away from said user's head.

27. In a cellular telephone having a first device which radiates electromagnetic radiation from at least a first portion thereof, said first portion positioned adjacent a user's head when said cellular telephone is in a normal use position, said antenna having an upper end, apparatus for protecting a user from electromagnetic radiation comprising:

a radiation-reflecting or -absorbing shield wherein said shield comprises a plurality of segments which can be folded substantially adjacent to one another;

a bellows wherein said segments are positioned on surfaces of said bellows; and a coupler positioning said shield on said telephone and maintaining said shield substantially between at least said first portion of said first device and the head of the user in a position extending to said upper end, to provide a field strength pattern of said electromagnetic radiation which, in a plane passing through said first portion of said antenna, said shield and said user's head, is substantially diminished in a first direction within said plane from said antenna toward said user's head without being substantially diminished within said plane from said antenna away from said user's head.

* * * * *